(No Model.) 2 Sheets—Sheet 1.
J. JACKSON.
BALL BEARING.
No. 392,956. Patented Nov. 13, 1888.
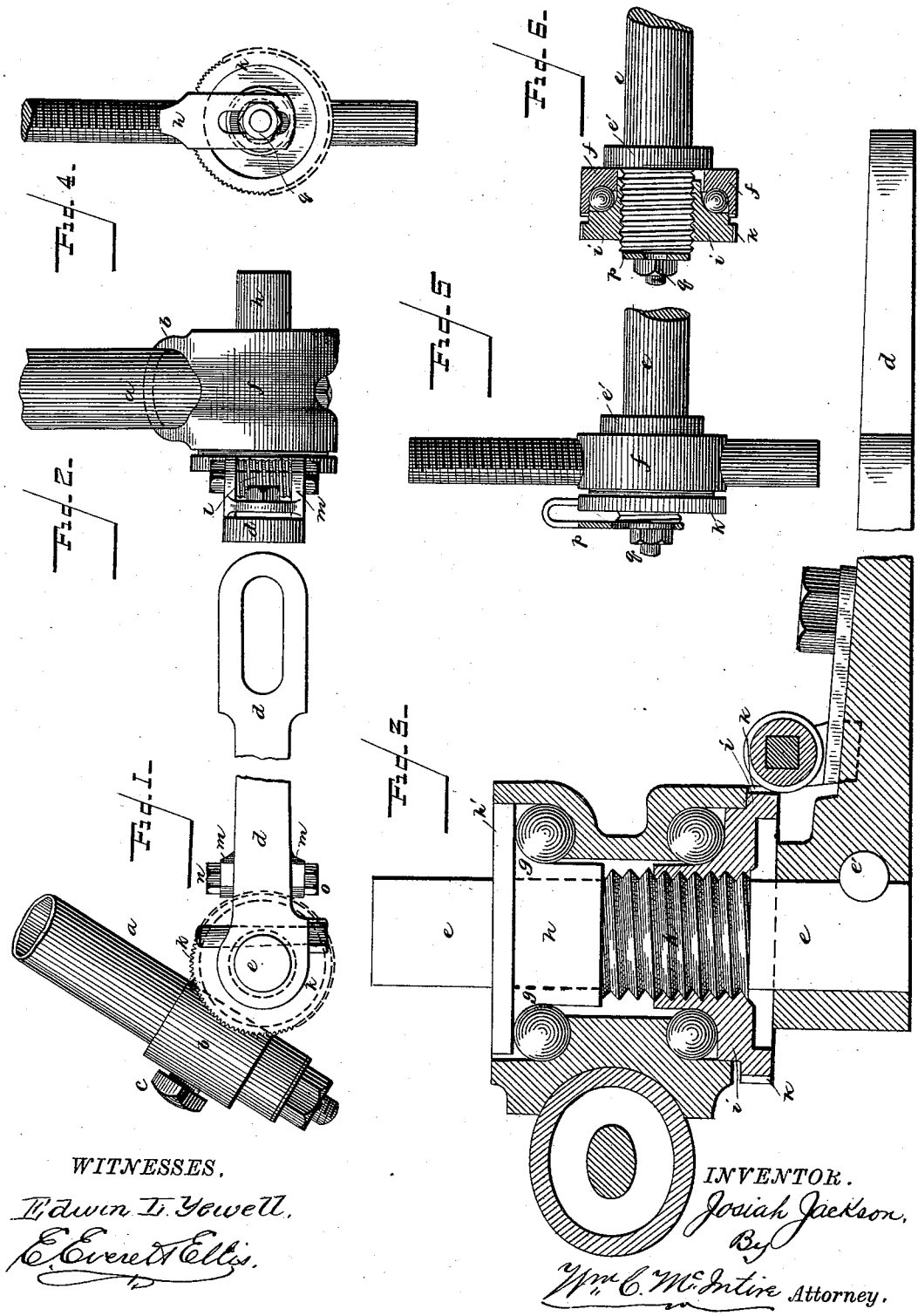
WITNESSES.
Edwin T. Yewell.
E. Everett Ellis.
INVENTOR.
Josiah Jackson,
By Wm. C. McIntire, Attorney.

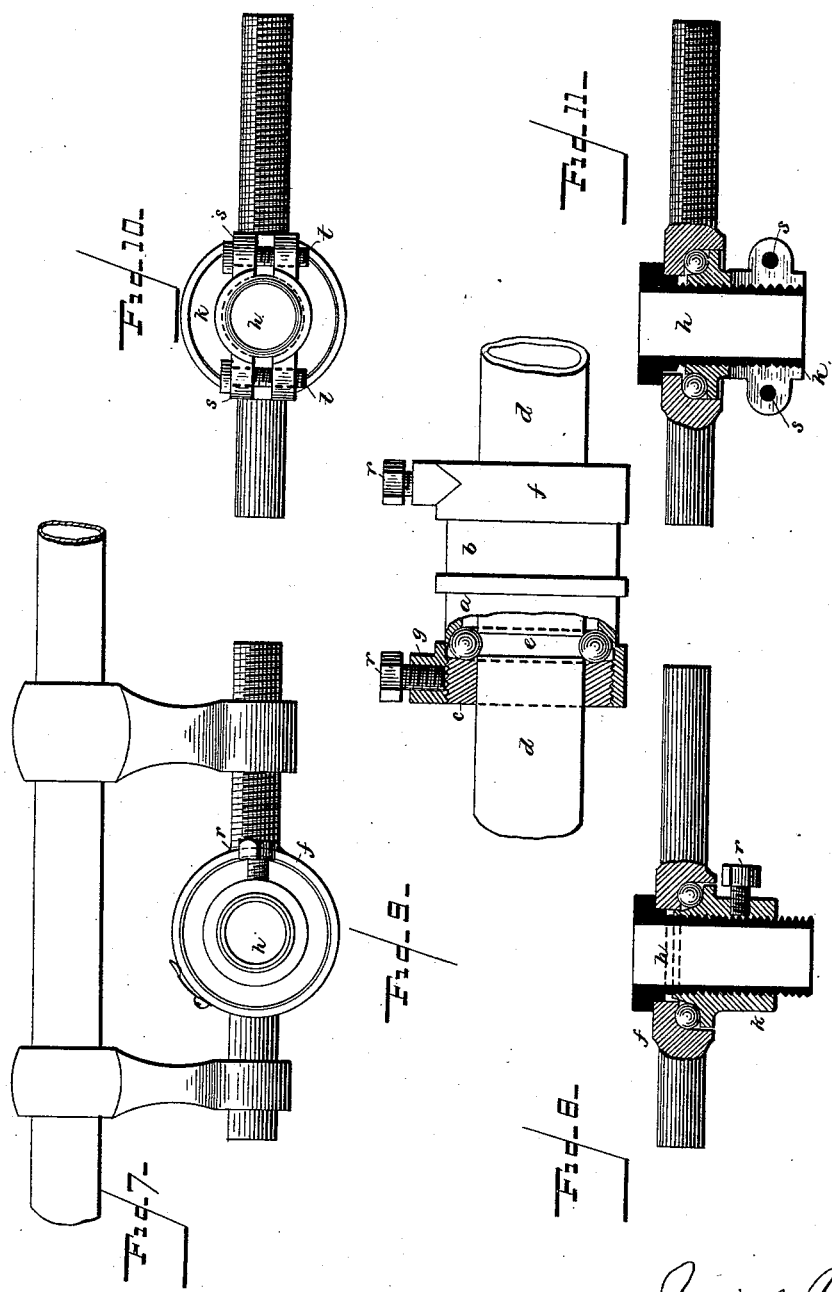

United States Patent Office.

JOSIAH JACKSON, OF COVENTRY, COUNTY OF WARWICK, ENGLAND, ASSIGNOR, BY MESNE ASSIGNMENTS, TO THE SPRINGFIELD BICYCLE MANUFACTURING COMPANY, OF MASSACHUSETTS.

BALL-BEARING.

SPECIFICATION forming part of Letters Patent No. 392,956, dated November 13, 1888.

Application filed July 3, 1888. Serial No. 278,889. (No model.) Patented in England January 3, 1885, No. 116.

*To all whom it may concern:*

Be it known that I, JOSIAH JACKSON, a subject of the Queen of Great Britain, residing at No. 59 Lower Ford Street, Coventry, county of Warwick, England, have invented a new and useful Improvement in Ball-Bearings for Bicycles, (for which I have obtained a patent in Great Britain, No. 116, bearing date January 3, 1885,) of which the following is a specification.

This invention relates to certain new and useful improvements in ball-bearings; and it consists, substantially, in such features of construction, arrangement, and combinations of parts as will hereinafter be more particularly described, and pointed out in the claims, and which was patented in England January 3, 1885, No. 116.

The object of this invention is an adjustable means for instantly regulating the wear in ball and roller bearings and in "setting" the same, so that perfect freedom of action shall always be obtainable without lateral play or "rattle," usually experienced in bearings of this kind as now constructed, which increases with wear and cannot easily be obviated.

According to this invention as applied to double bearings the balls or rollers are held in grooves of the usual form in a suitable bush or box and retained by collars or covers, upon which half the groove may be formed. These covers or collars are arranged to be drawn a certain distance into the bush for adjusting the balls, and instead of being fastened in any of the usual ways are formed with projecting sleeves, one with female thread and the other with male thread. The latter sleeve passes through the balls and bush and encircles the driving-shaft, which also passes through the bush. The adjustment of the balls is effected by screwing the collar with female thread down the sleeve with male thread, which draws the two collars nearer together. For the purpose of adjustment one of the collars is formed on the outside with a milled collar, which gears with a suitably-arranged cross-screw. This cross-screw, which is held between suitable standards and arranged to turn, prevents any shifting of the collar; but by turning the said screw the collar is screwed in either direction, thereby enabling a perfect adjustment of the bearings or grooves for the balls to be instantly effected. As additional security against shifting of the collar with sleeve with male thread a certain length of the sleeve may be squared and the interior of bush made to correspond, or other known means may be used for this purpose.

When this invention is applied to velocipedes, the cross-screw may be fitted on the crank.

A modification of the above is to dispense with the milled collar and cross-screw and to have the screwed sleeves of collars projecting outside bush and slit, the one with female thread for a suitable distance to form a spring, which by fitting the outside with lugs and cross-screws may be tightened round the inner sleeve to prevent shifting after adjustment, as before described. For additional security against turning, a pinching-screw may be suitably fitted to the split sleeve, so that the point may act against the inner sleeve. The driving-shaft passes through the inner sleeve, to which it may be secured by cross-pins or other known mechanical means.

The first plan is more suitable for double bearings and the second for single; but either may be used for either plan.

Referring to the accompanying drawings, Figure 1 represents an end view of one arrangement for carrying out this invention, having crank-arm attached; Fig. 2, a longitudinal view; Fig. 3, a sectional elevation; Fig. 4, an end view of another arrangement; Fig. 5, a side view of same; Fig. 6, a sectional view; Fig. 7, an end view of another arrangement; Fig. 8, a sectional view of same; Fig. 9, a side view, partly in section, of a modification of last figure; Fig. 10, an end view of another arrangement; Fig. 11, a sectional view of same.

Referring to Figs. 1, 2, and 3, $a$ represents part of frame of velocipede, having the bearing attached by collar $b$, secured to frame by outside screw, $c$. $d$ is crank-arm secured to axle $e$ by cross-pin $e'$; $f$, bush of bearing, being formed with a half bearing groove for the balls $g$ at interior of each end. Through this bush passes a sleeve, $h$, having a flange or collar, $h'$, at one end to retain one set of balls, A portion of this sleeve is screw-threaded on outside, down which a second collar or cover, $i$, is screwed, the inner side of which is made to form a half groove bearing for the other set of balls. It will be readily understood that the adjustment of the bearings for both sets of balls is effected by screwing down the cover $i$, which draws the flange or cover $h'$ into bush and against balls. The axle $e$ passes through sleeve $h$, to which it may be secured in any known manner. This cover $i$ is fitted or formed on outside with a flange, $k$, having its periphery cut with slanting teeth or a milled edge for a cross-screw, $l$, to gear in. This screw $l$ is held between two standards, $m$, attached to crank-arm $d$ by a bolt passing through and projecting beyond the standards. The length of bolt passing through screw $l$ is squared, as shown at Fig. 3, and hole made to correspond. This bolt is formed with an outside square head, $n$, and secured by nut $o$. The adjustment of the balls is effected by simply turning nut $n$ by spanner which revolves the screw $l$, thereby turning cover $i$.

Referring to Figs. 4, 5, and 6, these represent a modification suitable for a single set of balls. In this arrangement the screw $l$ of preceding plan is replaced by a turned-over piece, $p$, the hook end of which is formed with teeth corresponding to the milled edge $k$. The adjustment is effected by unscrewing nut $q$ sufficient to allow the piece $p$ to be pushed up to admit of edge of $k$ being free of teeth of $p$, so that cover $i$ can be screwed down by hand. In this arrangement the sleeve $h$ of preceding figures is not used, the axle $e$ being formed or fitted with outside collar, $e'$, and the part that passes through bush being screw-threaded for collar $i$ to screw onto, the balls being held off the thread by the sleeve part of $i$.

Referring to Figs. 7 and 8 these views represent another modification, in which the adjustment is secured by a pinching-screw. In this plan the sleeve $h$ has a collar or flange at one end, the remainder of it being screw-threaded and passed through narrow bush $f$. The adjustment of the balls is effected by screwing down a second sleeve, $k$, suitably provided with part bearing for the balls and secured on $h$ by screw $r$. The axle passes through $h$, to which it is secured in any suitable manner. This bearing may be attached to frame by brackets, as represented. A modification of this plan is represented at Fig. 9, and is the arrangement I use in double velocipedes capable of being converted into single ones, the two frames being fitted with a clutching arrangement to fasten round bush $f$ in grooves $a\ b$. In this plan it will be observed that the balls are held by screwed-in collar $c$ at each end, the said collar being secured from turning after adjustment by pinching-screws $r$. The bush is formed with studs $g$, to admit of more metal for the female thread of screw $r$. $d$ represents axle or sleeve for axle to pass through, held in bush by balls and grooves $e$. In double machines I use two of these double bearings.

Referring to Figs. 10 and 11, these views represent another modification of Figs. 7 and 8. The sleeve $h$ is used, as before described; but instead of the pinching-screw $r$, or supplementary to it, the sleeve $h$ is slotted down for a certain distance and formed with outside lugs, $s$, fitted with cross-screws $t$. When the bearing is to be adjusted, the screws are loosened, which admits of sleeve $k$ being screwed down. When the screws are tightened up, which firmly pinches the sleeve round $h$ for additional security, a pinching-screw may also be used.

Having thus described my invention, what I claim as new, and desire to secure by Letters Patent, is—

1. The combination, with the axle-sleeve exteriorly screw-threaded for a short distance from its inner end and formed at its outer end with an annulus or flange forming a half bearing groove, of the bush $f$, surrounding said sleeve and formed interiorly at each end with a half bearing groove, the two sets of balls, and the cover $i$, screwing onto the sleeve and formed with an exterior half bearing groove, the whole being so arranged and combined as that the turning of the cover will effect the simultaneous adjustment of both sets of balls, substantially as described.

2. The combination, with the bush $f$ and axle-sleeve $h$, of the adjusting-cover $i$, formed with an outside toothed or milled flange, and a gear meshing with said flange adapted to turn the cover when operated, as described and shown.

In testimony whereof I have hereunto set my hand in the presence of the two subscribing witnesses.

JOSIAH JACKSON.

Witnesses:
HAROLD WADE,
P. HARKER.